June 8, 1926.　　　　　J. LEDWINKA　　　　　1,588,117

CONVERTIBLE AUTOMOBILE BODY STRUCTURE

Filed July 22, 1919　　　7 Sheets-Sheet 1

Inventor
Joseph Ledwinka

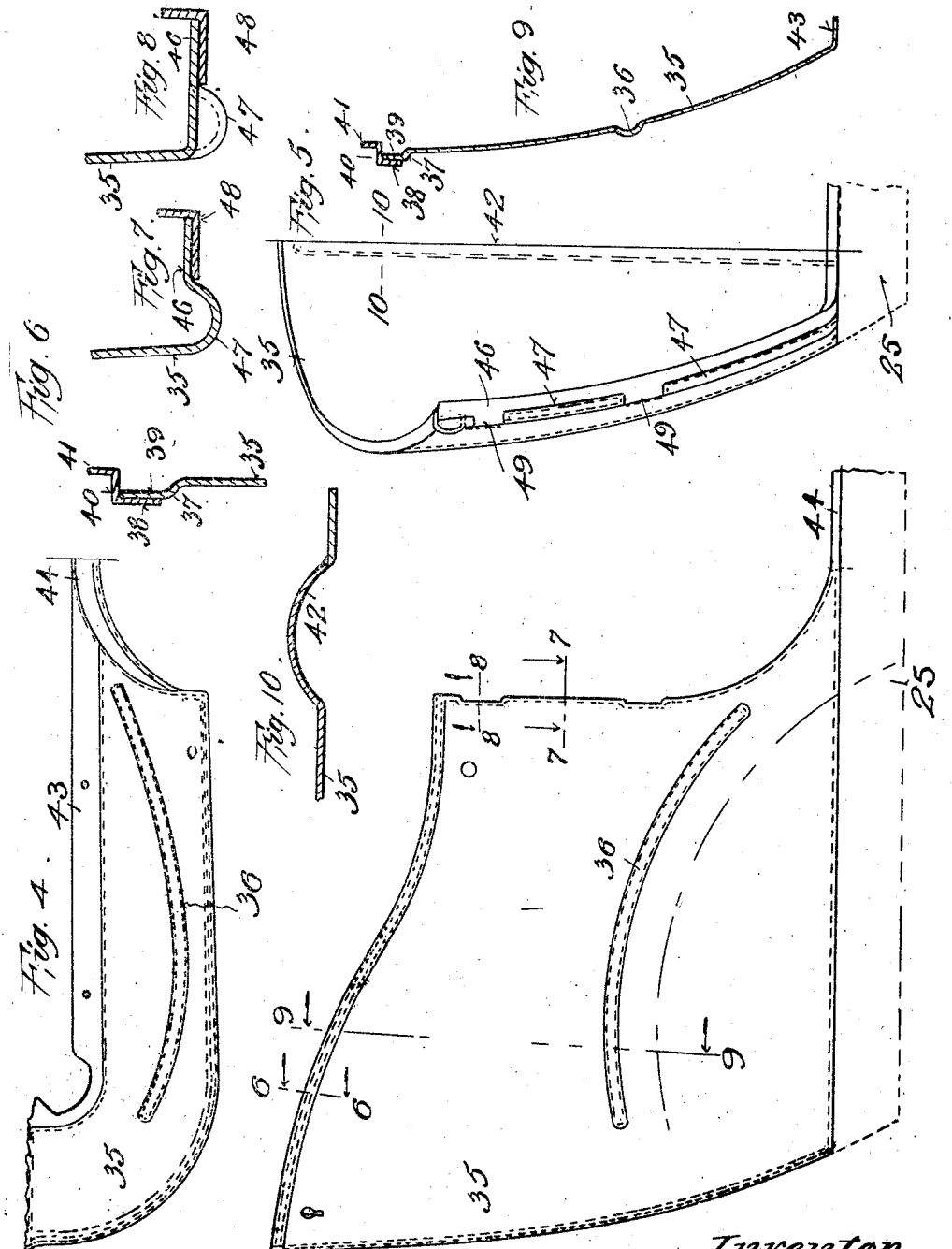

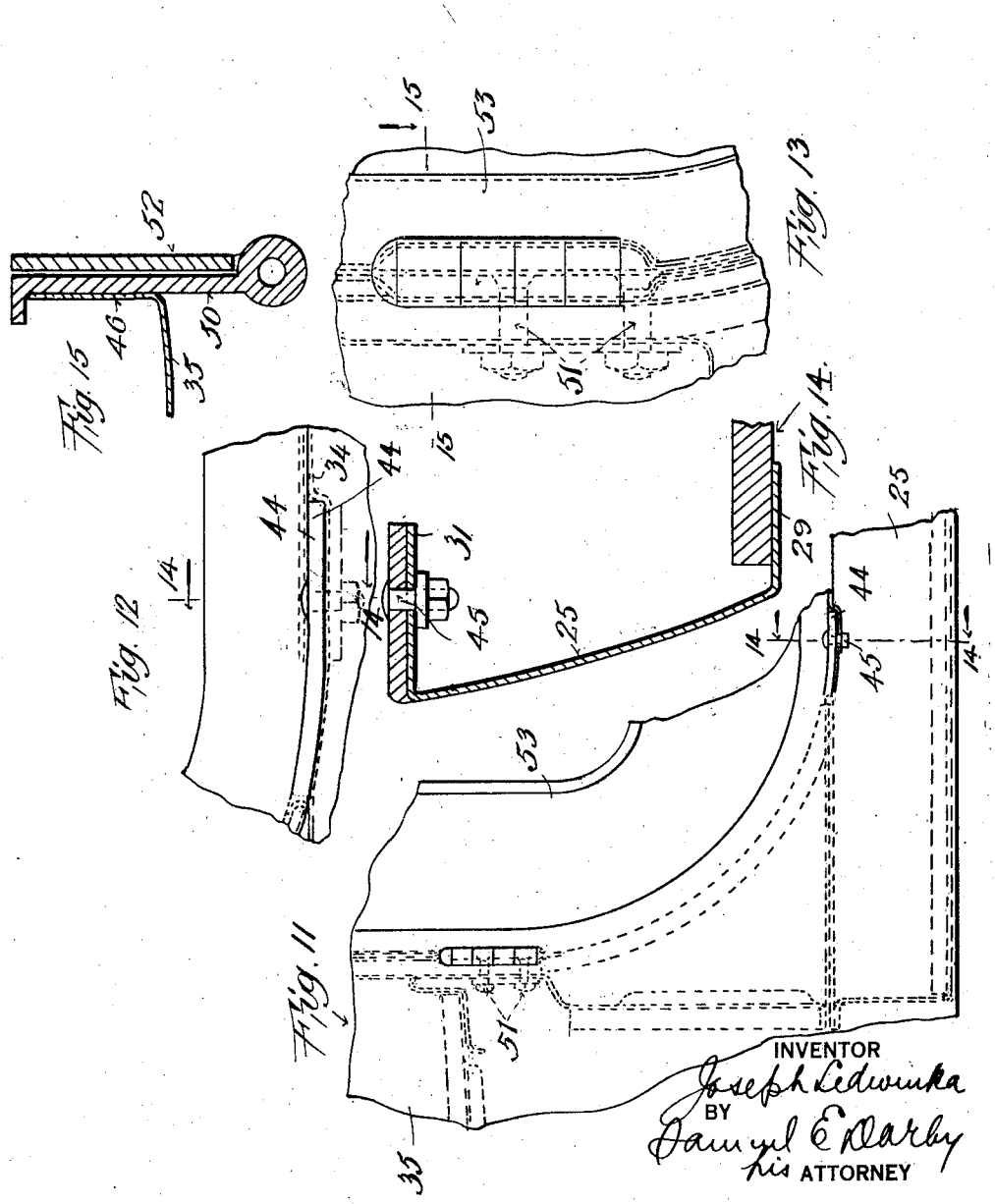

June 8, 1926.
J. LEDWINKA
1,588,117
CONVERTIBLE AUTOMOBILE BODY STRUCTURE
Filed July 22, 1919   7 Sheets-Sheet 4
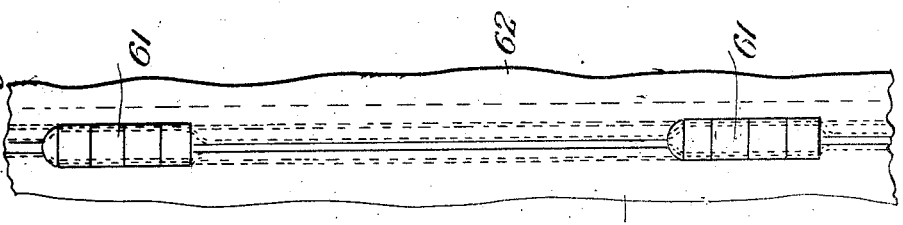
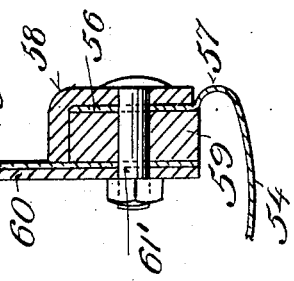
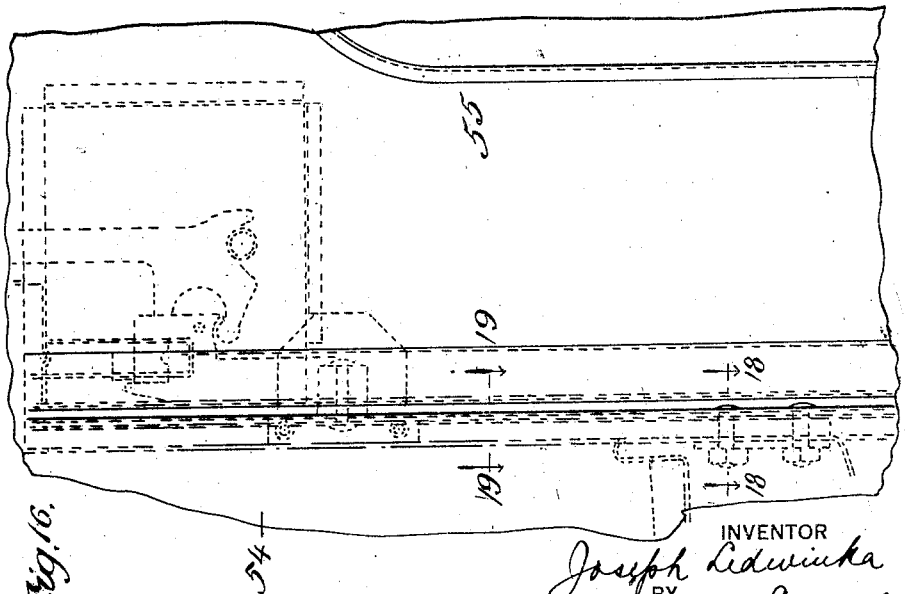
INVENTOR
Joseph Ledwinka
BY
Samuel E. Darby
his ATTORNEY June 8, 1926.

J. LEDWINKA 1,588,117

CONVERTIBLE AUTOMOBILE BODY STRUCTURE

Filed July 22, 1919　　7 Sheets-Sheet 6

Inventor
Joseph Ledwinka
by his atty Samuel Earlarly

June 8, 1926.
J. LEDWINKA
1,588,117
CONVERTIBLE AUTOMOBILE BODY STRUCTURE
Filed July 22, 1919 7 Sheets-Sheet 7
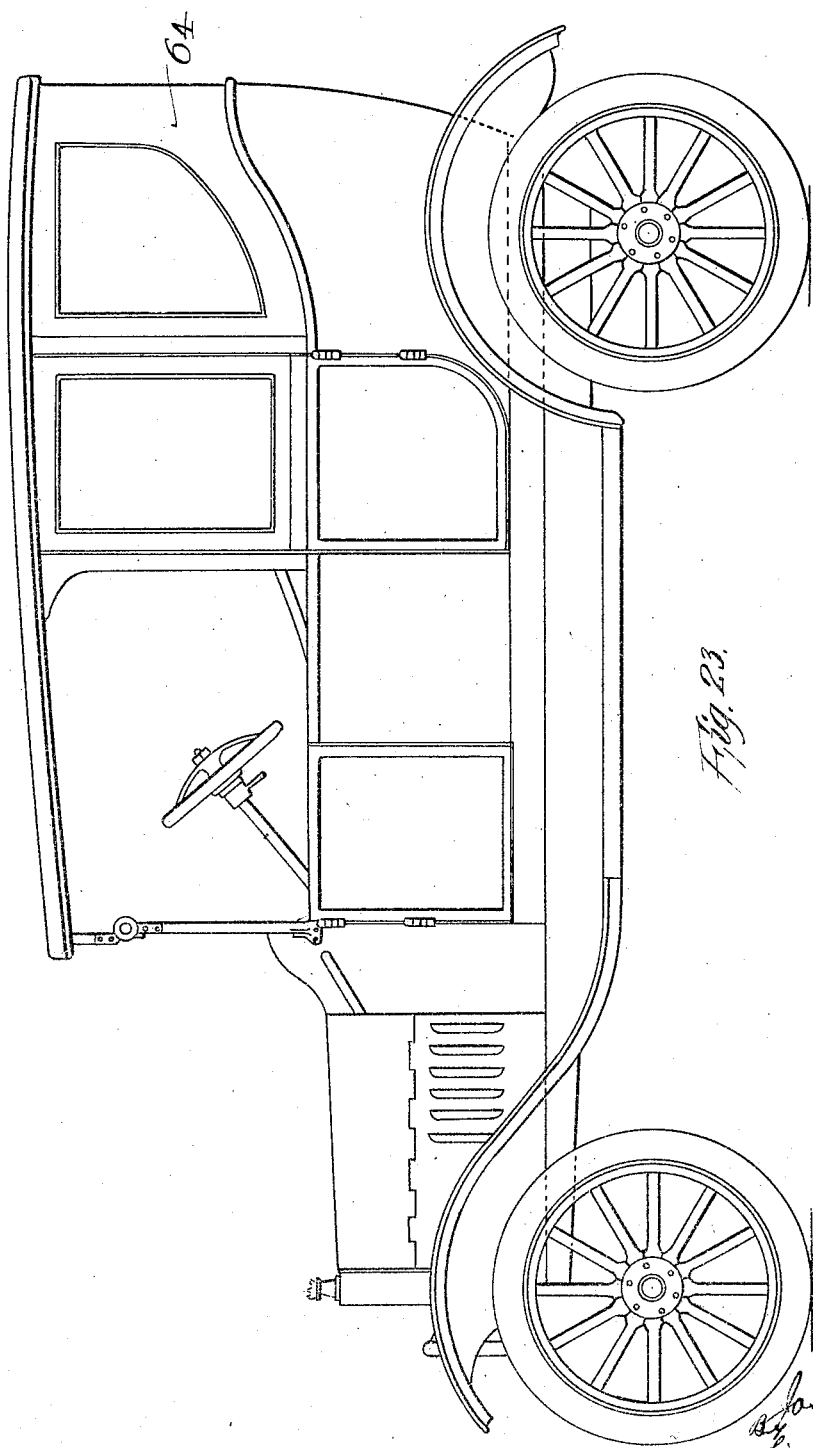

Patented June 8, 1926.

1,588,117

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

CONVERTIBLE AUTOMOBILE BODY STRUCTURE.

Application filed July 22, 1919. Serial No. 312,486.

This invention relates to convertible automobile body structures.

The object of the invention is to provide an automobile body structure which is simple, efficient and economical to manufacture.

A further object is to provide an automobile body structure which is composed of readily and easily detachable sections or units of standard form whereby the character of the automobile body may be altered by merely detaching and replacing various units of the structure.

A further object of the invention is to construct the body frame, the tonneau, the front seat, the cowl and the doors of automobile bodies in separate standard forms of units for detachable assembly.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the drawings:—

Fig. 3 is a view in side elevation of a tonneau unit, the rear portion of the body frame unit being indicated in dotted lines.

Fig. 4 is a broken view in top plan of the same.

Fig. 5 is a similar view in front elevation of the same.

Figs. 6, 7, 8, 9 and 10 are detail views in section on the lines 6, 6; 7, 7; 8, 8; 9, 9; and 10, 10 respectively, looking in the direction of the arrows.

Fig. 11 is a broken view in side elevation of the front end portion of the tonneau unit, showing the application thereto of the rear door.

Fig. 12 is a similar view on a somewhat larger scale, showing means for positioning the tonneau unit on and detachably securing the same to the body frame unit.

Fig. 13 is a similar view showing the hinge connection of the rear door to the tonneau unit.

Fig. 14 is a broken view in section on the line 14, 14, Figs. 11 and 12, looking in the direction of the arrows.

Fig. 15 is a similar view on the line 15, 15, Fig. 13, looking in the direction of the arrows.

Fig. 16 is a broken view in side elevation showing a portion of the front seat unit and the locking edge of the front door applied thereto.

Fig. 17 is a similar view of the cowl unit showing the application thereto of the front door hinges.

Fig. 18 is a broken detail view in section on the line 18, 18, Fig. 16 looking in the direction of the arrows.

Fig. 19 is a similar view on the line 19, 19, Fig. 16, looking in the direction of the arrows.

Figure 20:
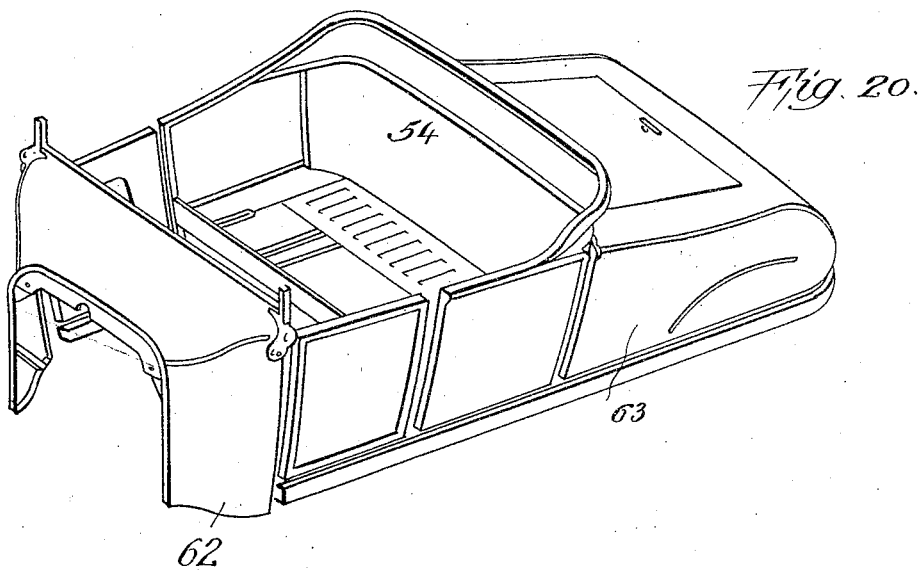

Fig. 20 is a view in perspective of an assembled body with the tonneau unit replaced by a box unit to form a runabout body.

Figure 21:
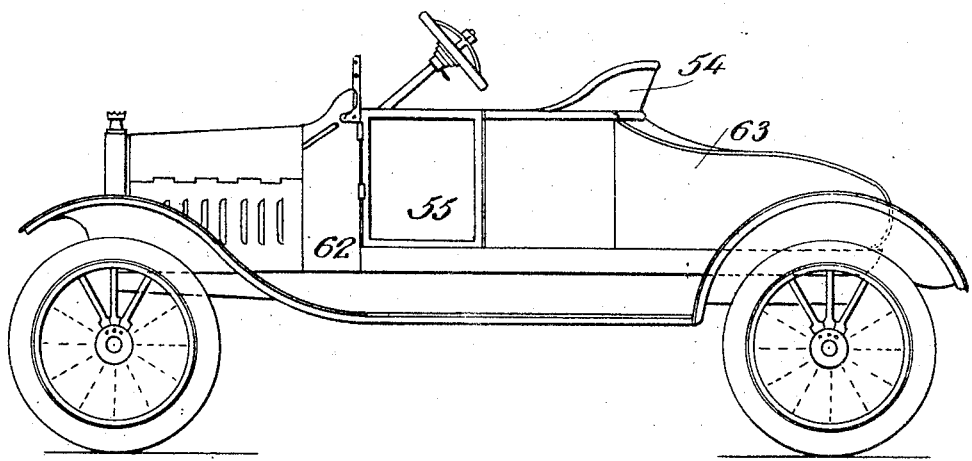

Fig. 21 is a side view of an automobile having a runabout body embodying the principles of my invention.

Figure 22:
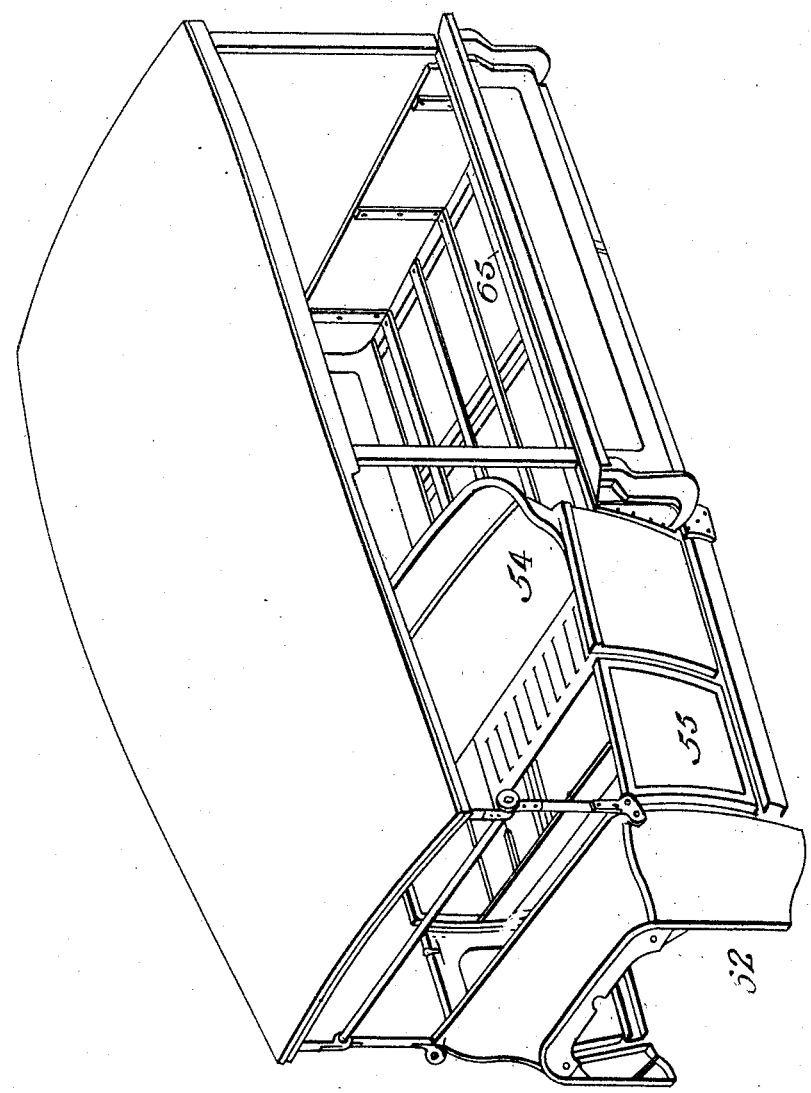

Fig. 22 is a view in perspective of an assembled body with the tonneau unit replaced by a truck or delivery wagon body unit assembled in accordance with my invention.

Fig. 23 is a view in side elevation of an automobile having an enclosed tonneau body unit assembled with the body frame, cowl and front seat units in accordance with my invention.

The same part is designated by the same reference numeral wherever it occurs throughout the several views.

It is among the special purposes of my present invention to provide an exceedingly inexpensive but efficient, strong and durable automobile body, and in carrying out the principles of my invention I propose to construct a body frame, a tonneau, a front seat, a cowl, and the necessary doors to make a complete body, in separate and independent units of standard form, and to detachably assemble these various units to form the complete body. By this method of construction I am enabled to secure great economy in the manufacture, handling and shipping of complete bodies. The various units required to make up complete bodies, being of standard form, may be manufactured in quantities and the units may be transported separately and assembled quickly and easily, thereby increasing the economy as well as speed of manufacture without sacrificing anything of strength and security, and enabling bodies to be manufactured very rapidly and sold very cheaply. By making the various units detachable they may be readily replaced with other units to transform the automobile into various types of vehicle, for instance, a touring car, a runabout, a coupé or enclosed body car, an express, delivery or truck wagon, or the like, thus greatly increasing, at minimum expense, the range of utilization of motor driven vehicles.

Figure 1:
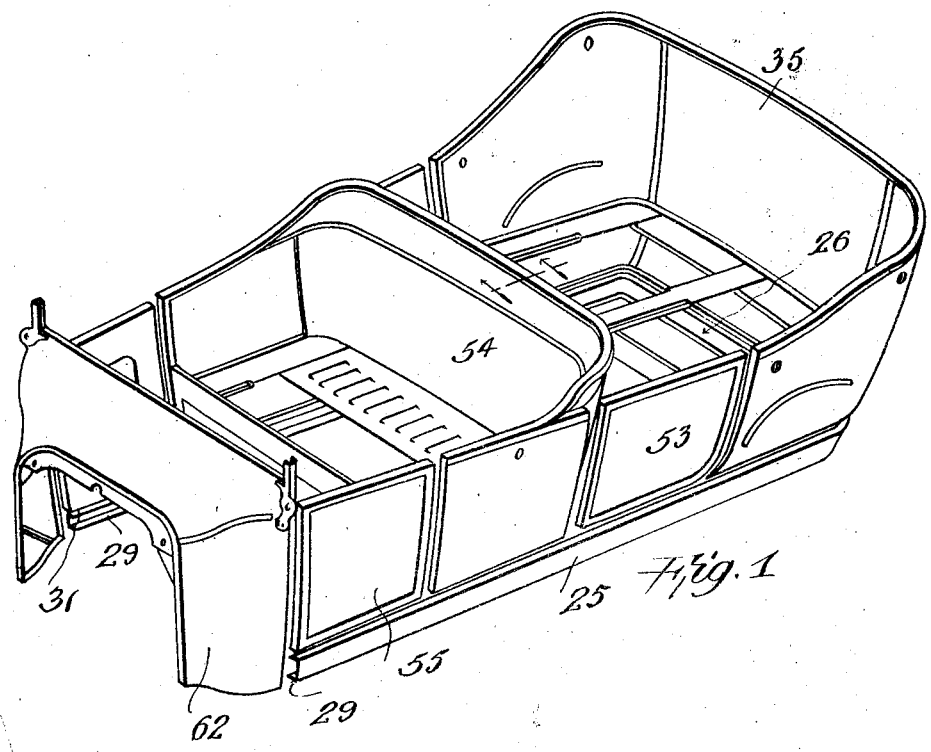
Fig. 1 is a view in perspective indicating the assembly of a body frame, tonneau, front seat, cowl and doors of a touring car body as separate and detachable units, in accordance with the principles of my invention.
Figure 2:
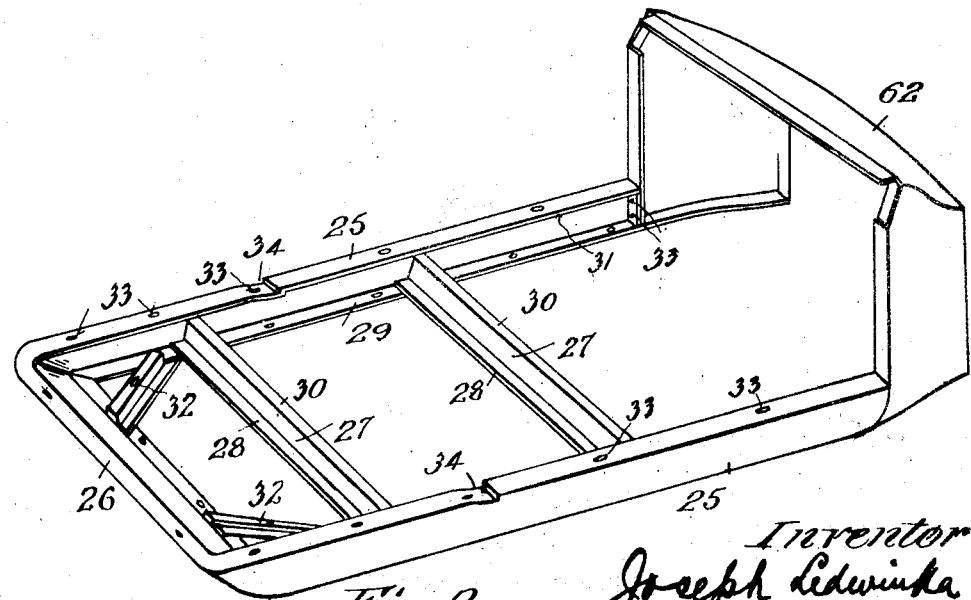
Fig. 2 is a similar view of the body frame unit, showing the cowl unit applied thereto.

In Fig. 2 I have shown the body frame unit. This unit consists of the side members or sills 25, which are stamped up out of sheet metal, and preferably are channel shaped in cross section, as shown in Fig. 14, the outer surfaces inclining downwardly and inwardly. The channels of these side members present inwardly towards each other. If desired the side members 25 may be formed in one piece with each other and bent into substantially U-shape, the connecting portion 26 constituting the rear end of the frame. Suitable cross members 27 connect the side members 25 and brace them. In the form shown the cross braces 27 are sheet metal stampings Z-shaped in cross section, the lower flange 28 thereof resting on the lower flanges 29 of the side members and the upper flanges 30 bearing against the under surface of the upper flange 31 of the side sills 25. If desired additional struts or braces 32 may be connected between the end portion 26 of the body frame and the side members or sills 25. The various parts constituting the body frame above described are secured together in any desired manner, preferably by electrically welding them, thus forming a strong, substantial rugged body frame composed of simple stampings which can be easily stamped or shaped, handled, assembled and secured together.

The body frame is formed with suitable openings 33 which are formed therein in standard spacing relation to receive the securing means for the cowl, tonneau and front seat units. Also suitable shouldered seats or depressions 34 are formed in the upper surfaces of the side members or sills 25 for the purpose of aiding in assembling the tonneau or other unit to be applied thereto.

The body frame above described is to be detachably secured to the chassis of the automobile in any suitable or convenient manner.

The tonneau unit is shown at 35 and consists of a sheet metal stamping preferably formed in one integral piece and pressed to the desired shape and curvature. If desired a curved stiffening rib 36, see Figs. 3, 4, and 9, may be formed in this stamping by stamping out the same. The upper edge of the tonneau stamping is deflected or bent outwardly, as indicated at 37, see Figs. 6 and 9, and a reinforcing angle strip is applied to the upper edge of said stamping. This angle strip is formed with a flange portion 38, which lies against the side surface of the upper edge portion 39 of the stamping; also with a horizontal portion 40 which extends across the upper edge surface of the stamping and which terminates in an upturned flange 41. The angle strip not only serves to stiffen and strengthen the upper edge of the tonneau stamping but it also affords convenient means for attaching the trim and upholstery thereto. The stamping 35 may also be formed with a vertically disposed stiffening bead 42 stamped therein at its rear portions. At its lower edge the stamping 35 is formed with an inturned flange 43 by means of which this unit member may be detachably secured to the body frame above described. The extreme forward end portions 44 of the sides of the tonneau stamping are received against the shoulders of the depressions or seats 34 in the side sills or members 25 and are thereby properly positioned on the frame unit. This facilitates the assembly of the body. These end portions are bolted to the flange 31 of the body frame unit, as indicated at 45. The edge of the stamping 35 forming the door opening is turned inwardly to form the flange 46, see Figs. 5, 7 and 8. If desired, and as shown, beads or ribs 47 are formed in this flange at its junction with the main body of the stamping 35. This strengthens the portion of the stamping 35 which forms the door opening. To still further strengthen the flange 46 and to stiffen the same as a post or support for the door hinges, an angle strip stamping 48 is applied thereto. At the points where the door hinges are secured to this post or support the rib or bead 47 is omitted, as shown at 49, Fig. 5, to permit the hinge member 50 to lie flat against the flange 46, as shown in Fig. 15, and to be secured thereto as, for example, by means of bolts 51, as indicated in dotted lines in Fig. 13. The other members 52 of the door hinges are secured to the door 53.

The front seat 54 is likewise formed as a single separate unit to be detachably secured to the frame body, and it is formed at its front vertical edge to receive the locking edge of the front door 55. For this purpose the vertical edge of the stamping is formed with an inturned flange 56 having a stiffening rib or bead 57 at its junction with the body of the seat panel 54. To the flange 56 is applied an angle shaped stamping 58. If desired a wooden strip 59 is applied against the inner surface of the flange 56, see Fig. 18, and the end of a cross piece 60 is secured to said block by means of bolt 61' which passes through the said cross piece and block and also through the flange 56 and angle plate 58. This cross piece 60 forms a support for the front seat panel.

The front door 55 is hinged, as shown at 61, to the rear vertical edge portion of the cowl unit 62.

The cowl unit 62 is formed of sheet metal which is stamped into the required or desired shape and is detachably secured to the front ends of the body frame.

In order to convert a body from a touring car to a runabout form it is only necessary to remove the tonneau 35 from the body frame and replace it with a runabout box panel 63, see Figs. 20 and 21.

Likewise, if desired, the tonneau unit may be replaced by an enclosed body unit 64 to produce a limousine as shown in Fig. 23, or by a body unit 65 to form a delivery or express body, as shown in Fig. 22.

From the foregoing description it will be seen that I provide an exceedingly simple all steel structure of convertible body, the parts of which can be manufactured in large quantities at very low cost. The various parts are made in separate and detachable units which can be easily and readily handled, transported and assembled.

Having now set forth the objects and nature of my invention, and a structure embodying the principles thereof, what I claim as new and useful and of my own invention, and desire to secure by Letters Patent is:—

1. In combination, a chassis, a body superstructure comprised of a multiple number of subassembly superstructure units adapted to be separately mounted, and a substantially flat body underframe unit interposed between and interconnecting the chassis and the superstructure, and comprised of the main body side sills and interconnecting cross braces from which the principal longitudinal and transverse strength of the superstructure at large is derived.

2. An automobile body as a self contained convertible structure adapted to be mounted as such upon an automobile chassis and comprising a substantially flat body underframe unit comprised of the main body side sills and interconnecting cross braces, through which underframe connection with the chassis is made, and a body superstructure comprised of a number of subassembly superstructure units separately mounted on said body underframe in such manner as to derive from the underframe principal longitudinal and transverse strength for the superstructure at large.

3. An automobile body as a self contained multiple unit structure adapted to be mounted as such upon an automobile chassis and comprising a substantially flat body underframe unit comprised of the main body side sills and interconnecting cross braces, through which underframe connection with the chassis is made, and a body superstructure comprised of a number of subassembly superstructure units separately mounted on said body underframe in such manner as to derive from the underframe principal longitudinal and transverse strength for the superstructure at large, which superstructure includes a cowl unit joined to the underframe substantially in the vertical transverse plane of the front door posts of the body.

In testimony whereof I have hereunto set my hand on this 12th day of July A. D., 1919.

JOSEPH LEDWINKA.